April 12, 1960     B. E. VAN EVERY ET AL     2,932,769
HEADLIGHT DIMMER

Filed Feb. 7, 1957     2 Sheets-Sheet 2

INVENTORS
BLISS E. VAN EVERY
VERLIS H. WILEY
BY
*Robert E. Travers*
ATTORNEY

United States Patent Office 2,932,769
Patented Apr. 12, 1960

2,932,769

HEADLIGHT DIMMER

Bliss E. Van Every, Buffalo, and Verlis H. Wiley, Farmersville Station, N.Y., assignors, by mesne assignments, to Sylvania Electric Products Inc., Wilmington, Del., a corporation of Delaware Application February 7, 1957, Serial No. 638,840

2 Claims. (Cl. 315—78)

This invention relates to an automatic headlight dimmer control unit and more particularly to a control unit of this type employing speed related means for altering the action of the control unit.

Control circuits and apparatus for automatically regulating the beam position of vehicle headlights generally have a light sensitive device such as a photo-multiplier mounted in an appropriate position on the vehicle to pick up the projected lights of oncoming vehicles. The electrical signal produced by energization of the photo-multiplier is usually supplied to a switching circuit, which in turn causes a beam positioning relay to operate. This switching circuit may be constructed to cause the relay to change beam positions in either the presence or absence of light, as desired.

A headlight beam control apparatus of the type described above does not provide means for preventing hunting of the beams during certain conditions of vehicle operation. For instance, at slower driving speeds, i.e., below 40 miles per hour, it is desirable to have a slower beam changing operation since it eliminates needless beam switching. When driving along a periodically lighted thoroughfare or a heavily traveled highway at a low rate of speed, or when turning a corner in a lighted residential area, the beam control apparatus tends to switch the beams between high and low positions each time dark or light sections appear ahead. This hunting effect is annoying and causes driving hazards.

Accordingly, an object of the invention is the provision of an improved control for vehicle headlight beam positions.

Another object is the reduction of the frequency of beam condition changes at lower vehicle speeds.

A further object is the provision of a delayed beam condition changing operation which is related to vehicle speed.

The foregoing objects are achieved in one aspect of the invention by the provision of a headlight beam control apparatus having vehicle speed related means operable to delay the operation of a beam altering or changing device at vehicle speeds below approximately 40 miles per hour.

For a better understanding of the invention, reference is made to the following description taken in conjunction with the accompanying drawings in which.

Figure 1:
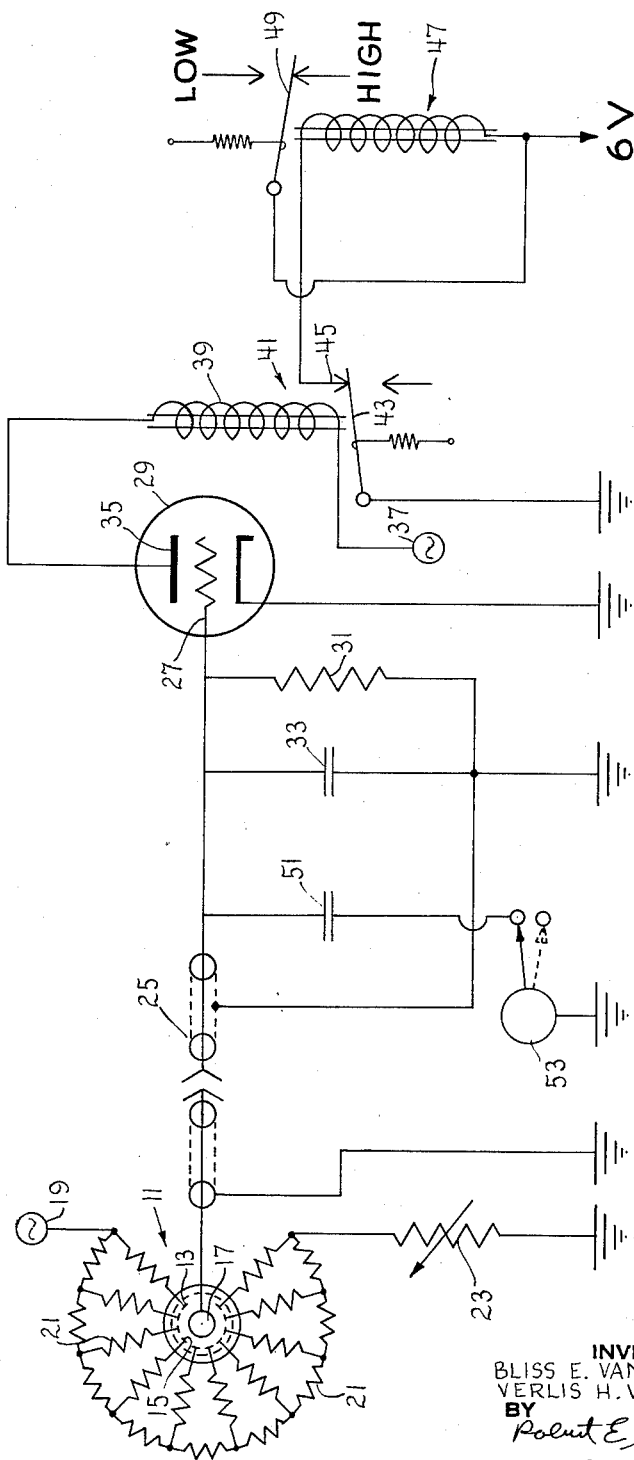
Fig. 1 is a circuit diagram of a headlight dimmer control unit.

Referring to Fig. 1, a light sensitive device such as a photo-multiplier tube 11 is shown comprising an electron emitter 13, dynodes 15, and anode 17. The tube is mounted in a suitable position on a vehicle so that illumination external to the vehicle will impinge upon cathode 13. The electrons emitted from the cathode upon impingement of light are multiplied through the successive dynode stages to produce an electron current traveling from the last dynode to anode 17 which has a magnitude far in excess of the initial cathode emission.

When light sensitive device 11 is operating, the cathode 13 may have a potential of approximately 800 volts below ground by virtue of the connection with a suitable A.C. source 19 such as a battery supplied vibrator and output transformer. This voltage is uniformly distributed among the dynodes by means of resistors 21. The last dynode of device 11 is connected to ground through a variable resistance 23, which serves to control the sensitivity of the light sensitive device through control of the voltage drop between the multiplier stages.

The anode 17 of device 11 is coupled through a shielded cable 25 to control grid 27 of a thermionic tube 29 such as type 6J5. Grid resistance 31 is grounded and may have a value of approximately 2.7 megohms. Filter capacitance 33 which is shunted across the grid resistance, may be approximately .0005 micro-farads. When light sensitive device 11 is operating, a negative bias is imposed upon grid 27 by virtue of the current flow from ground through resistance 31 to anode 17 and thence to resistor 23 and back to ground.

The anode 35 of tube 29 is connected to a suitable A.C. supply 37, which is in phase with supply 19, through coil 39 of relay 41. The supply 37 provides a potential above ground sufficient to cause current flow from the supply through coil 39 and tube 29 to ground when grid 27 is not biased beyond the desired operating characteristic of the tube. When energized, coil 39 of relay 41 causes the spring loaded switch arm 43 to move to the upper contact 45, which serves to connect the coil or beam condition altering means of switching relay 47 with a suitable power supply such as the 6 volt vehicle battery. Spring loaded switch arm 49 is shown to be in the high beam condition when tube 29 is conducting.

A time delay device such as capacitance 51, which may have a value of .25 micro-farads providing a time delay of approximately .75 seconds, is shunted across grid resistor 31 at the lower end of the vehicle speed range by means of the speed related switch 53. This switch serves to connect time delay device 51 in the circuit at speeds up to approximately 40 miles per hour and disconnect capacitance 51 at speeds in excess of this value as will be hereafter described.

The operation of vehicle speed related switch 53 reduces the hunting rate of the automatic headlight control unit at lower speeds under conditions where there is a given occurrence rate of external illumination variations. For example, when turning a corner or traveling along a periodically lighted thoroughfare or when moving along a moderately heavily traveled highway at a speed under 40 miles per hour, the headlights would normally switch from low to high beam after passing each lighted area. At higher speeds, this hunting effect is not evident since the time elapsed between successive illuminated areas is not sufficient to cause the beam to switch to the high position. It is apparent that when a vehicle is traveling at higher speeds, i.e., 60 miles per hour, along a normally non-congested highway, a fast beam switching action is desired. Therefore, it can be seen that the provision of speed related beam condition altering means such as switch 53 provides a slower operation of the control circuit at slower speeds while allowing a fast beam changing operation when it is desirable.

When there is no external light impinging upon cathode 13 of device 11, the tube 29 is operating since grid 31 is effectively at ground potential. Consequently, relays 41 and 47 are energized to cause beam position altering switch 49 to make contact with the high beam position.

When the vehicle is traveling at the low end of the speed range, and when light impinges upon cathode 13, current flows from ground through the grid circuit of tube 29 to bias the tube to cut off or to some value of plate current below the operating value of relay 41. Under these driving conditions, speed related switch 53 is in the circuit contact position, and time delay device or capacitance 51 is charged positively on the ground side. The switch arm 49 moves to the low beam condition at this time.

When the external light source passes and the light sensitive device ceases to be energized, the bias on grid 31 is maintained for a prescribed period of time by virtue of the current flow around the grid circuit loop from capacitance 51 through ground to the grid and back to the other side of the capacitance. After the charge on capacitance 51 has been dissipated, tube 29 begins to operate again to effect beam switching back to the high position. As stated heretofore, at higher vehicle speeds, switching means 53 is open, and time delay device 51 is removed from the circuit.

Although the control unit shown in Fig. 1 operates to provide non-energization of the beam relay 49 when light sensitive device 11 is actuated, it is to be understood that a suitable circuit providing energization of relay 49 when device 11 is actuated is within the scope of the invention. For instance, tube 29 can be made to operate at the same time device 11 operates with proper selection of polarities for the electrodes of these elements.

Figure 2:
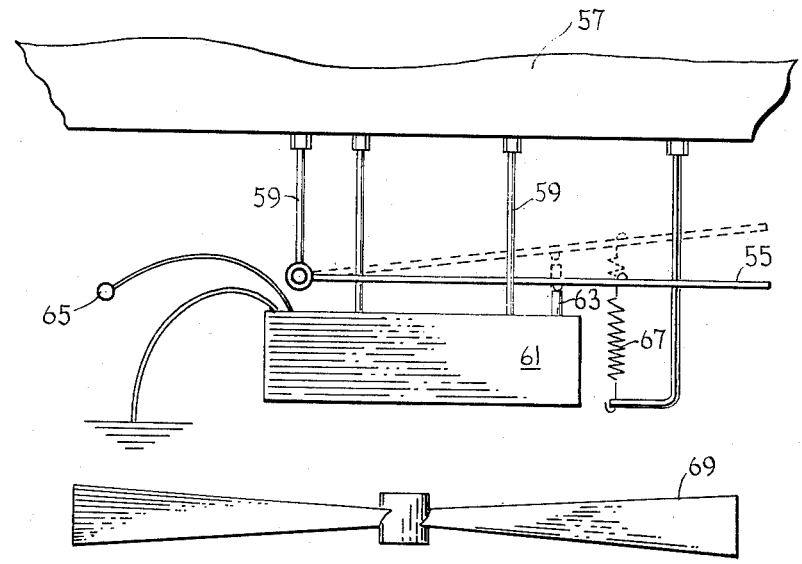
Fig. 2 is one embodiment of a switching device adapted for operation in the circuit of Fig. 1.

Fig. 2 illustrates one embodiment of the vehicle speed related switching mechanism 53 adapted to be used with the circuit of Fig. 1. This switch is shown as having an actuating air vane 55 rotatably mounted upon a housing 57 by means of a stud 59. Also mounted upon the housing by means of the studs 59 is a switch box 61 having a contact arm positioned therein which moves in accordance with the pressure applied to it by a reciprocatingly mounted spring loaded plunger 63. The contact arm within box 61 is connected to ground at one end while the other end moves to and from engagement with a contact element which may have a terminal 65 leading to a time delay device or capacitance 51. A spring 67 is attached to vane 55 to normally impart an inward pressure upon plunger 63.

For purposes of illustration, the switch mechanism is shown to be positioned behind a fan 69 of the type which is conventionally mounted upon the crank shaft of the vehicle engine. It can be seen that if sufficient air pressure is exerted by rotation of the fan, vane 55 can be moved in the direction of the air flow and away from plunger 63. When the vehicle speed is under approximately 40 miles per hour, the air pressure exerted on vane 55 is not sufficient to move it from engagement with plunger 63. However, at higher vehicle speeds, the higher fan r.p.m. creates an air flow sufficient to rotate vane 55 away from plunger 63. The outward movement of the plunger opens the circuit to capactiance 51.

Although the switch mechanism illustrated in Fig. 2 is shown to be air pressure actuated, it is to be understood that any suitable fluid pressure mechanism or exhaust pressure device may also be applicable so long as the actuating means of the switch is related to vehicle speed. It would be advantageous to employ a toggle type switch with the embodiment of the invention shown in Fig. 2 to insure a positive action between contacts.

Figure 3:
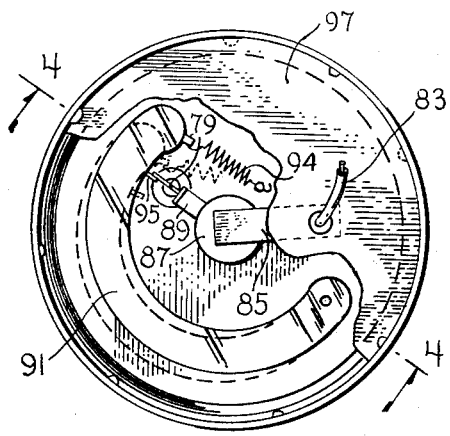
Fig. 3 is another embodiment of a switching device adapted for operation in the circuit of Fig. 1.
Figure 4:
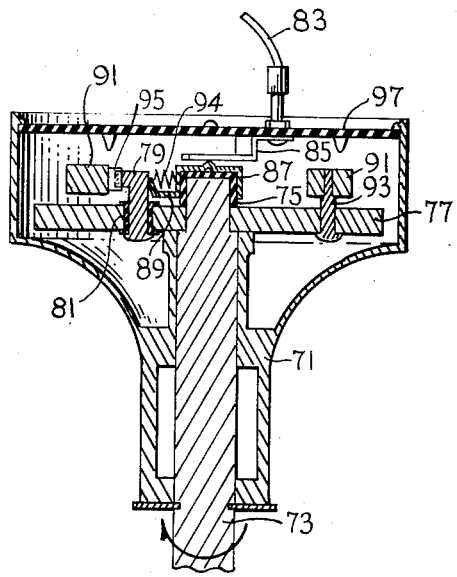
Fig. 4 is a section taken along line 4—4 of Fig. 3.

Figs. 3 and 4 show another embodiment of a switch mechanism adapted for operation in the circuit of Fig. 1. The switch comprises a stationary housing 71 having a rotating shaft 73 mounted therein. This shaft is formed as part of or coupled to a rotating apparatus on the vehicle which is related to the speed. Such a rotating apparatus may be the crank shaft, fan belt, generator shaft, drive shaft, wheel etc. Affixed to the top of shaft 73 by means of insulating cover 75 is a rotating plate 77. An appropriately formed conductor 79 is mounted upon plate 77 by insulating sleeve 81. The conductor is connected to lead 83 through stationary strap 85, conductive cap 87 and linkage 89. A switch arm 91 is mounted upon plate 77 and held in spaced relationship thereto by virtue of a metallic rivet 93 at one end and spring 94 at the other end. The flexible switch arm 91 is curved about shaft 73 so that contact lug 95, which is affixed to the arm, is normally biased by spring 94 to an engagement position with conductor 79. Lead 83 is insulated from housing 71 by closure member 97 so that the switch mechanism terminals, when connected to the circuit of Fig. 1, is between ground potential of housing 71 and the lead 83 coupled to capacitance 51.

When the vehicle is traveling at speeds under 40 miles per hour, the centrifugal force exerted on arm 91 by rotation of shaft 73 is not sufficient to disengage lug 95 from conductor 79. Consequently, time delay device 51 is connected in the headlight circuit. However, the construction of arm 91 and the characteristics of spring 94 are such that at vehicle speeds above approximately 40 miles per hour, the r.p.m. of speed related shaft 73 and all of the components mounted thereon provides sufficient centrifugal force to cause arm 91 to move away from its normal position as shown by the dotted lines in Fig. 3. This movement disengages conductor 79 from lug 95 and thereby removes time delay device 51 from the circuit of Fig. 1.

It is apaprent that the vehicle speed related switching mechanisms shown in Figs. 2 through 4, which illustrate fluid pressure and rotational mechanism actuating forces, are only several examples of the various structures and principles which could be used in this aspect of the invention. For example, vehicle speed related switching mechanisms may be employed which are operable in accordance with the electrical system used to generate the electrical power for the vehicle, or with the electrical fuel ignition system.

One embodiment of the speed related means for altering the normal operation of the control unit has been shown in Fig. 1. However, this invention is applicable to other structures and circuits as well. For instance, a transistor circuit with appropriate time delay means may accomplish the same result. Also, a speed related mechanism such as an air vane may operate directly on the switch arm of relay 47 to prevent its movement below a prescribed vehicle speed. Still another manner of accomplishing the desired results would be by the provision of speed related means formed to alter variable resistance 23 or otherwise increase the sensitivity of device 11 at low vehicle speeds.

Although several embodiments of the invention have been shown and described, it will be apparent to those skilled in the art that various changes and modifications may be made therein without departing from the scope of the invention as defined by the appended claims.

What is claimed is:

1. In a vehicle control for automatically altering the headlight beam from one condition to another in response to external illumination variations, the combination comprising light sensitive means providing a signal in response to the illumination variations, a signal controlled beam condition altering means coupled to said light sensitive means including a grid controlled electron tube, a paralleled resistor and capacitor connected between the grid and ground, and vehicle speed related means having a time delay capacitor and pressure actuated switching means shunting the parallel resistor and capacitor and operable to couple said capacitor to said beam condition altering means at the low end of the vehicle speed range and to disconnect said capacitor from said beam condition altering means above the low end of the vehicle speed range.

2. In a vehicle control for automatically altering the headlight beam from one condition to another in response to external illumination variations, the combination comprising light sensitive means providing a signal in response to the illumination variations, a signal controlled beam condition altering means coupled to said light sensitive means including a grid controlled electron tube, a paralleled resistor and capacitor connected between the grid and ground, and vehicle speed related means shunting the paralleled resistor and capacitor and having a time delay capacitor and switching means comprising a rotating mechanism and a contact formed to move in accordance with the rotational velocity of said mechanism, said switching means being operable to contact said capacitor with said beam condition altering means at the low end of the vehicle speed range and to disconnect said capacitor from said beam condition altering means above the low end of the vehicle speed range.

References Cited in the file of this patent

UNITED STATES PATENTS

| | | |
|---|---|---|
| 1,213,073 | Carr | Jan. 16, 1917 |
| 1,241,284 | Rhoades | Sept. 25, 1917 |
| 1,277,104 | Mulvaney et al. | Aug. 27, 1918 |
| 2,048,715 | Sorensen | July 28, 1936 |
| 2,308,097 | Murray | Jan. 12, 1943 |
| 2,807,752 | McIlaine | Sept. 24, 1957 |